June 9, 1964 P. D. PARKHE 3,136,275
SEED DRILLING MACHINES
Filed March 22, 1962 3 Sheets-Sheet 1
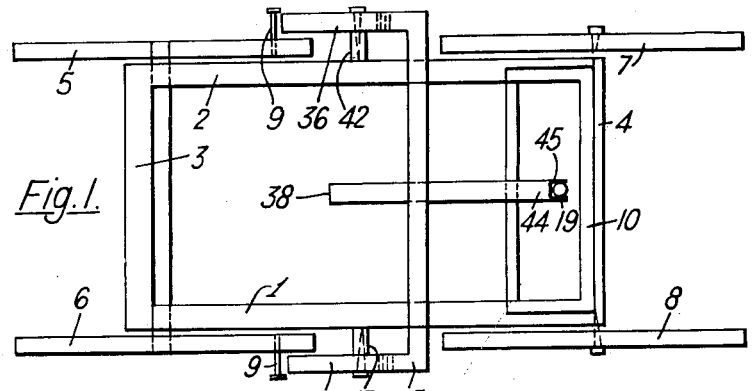
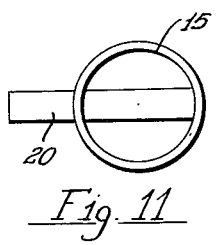
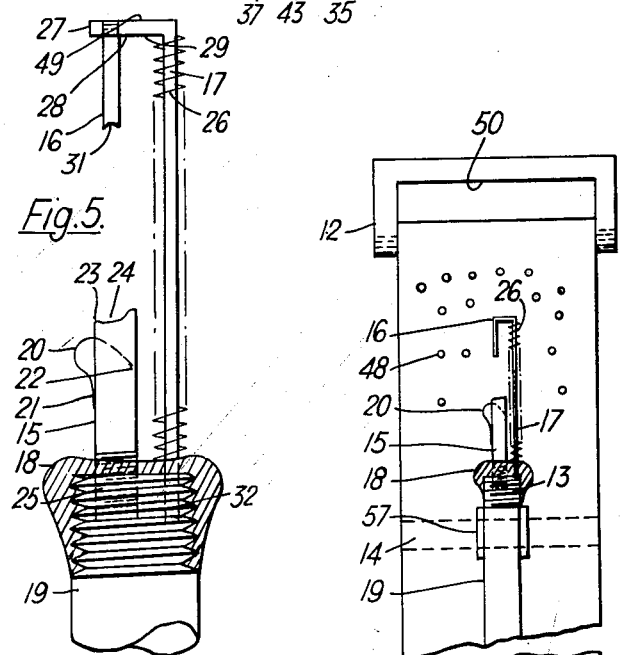
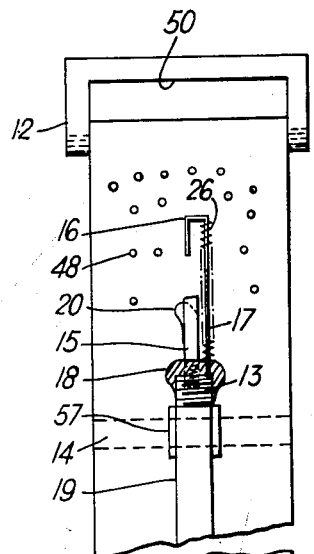
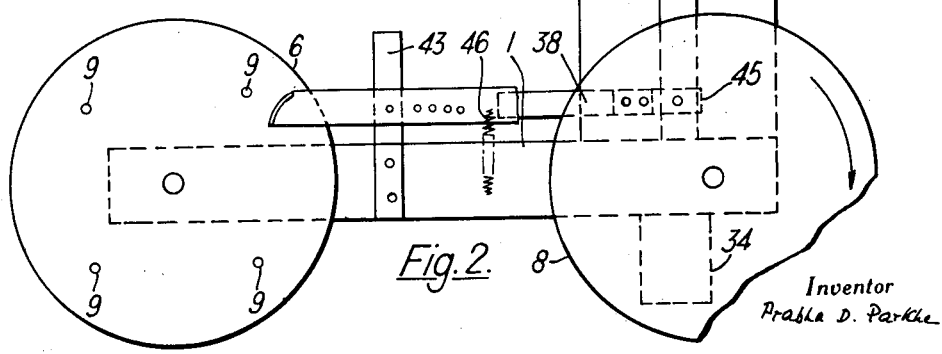
Inventor
Prabha D. Parkhe
By Michael S. Striker
Attorney

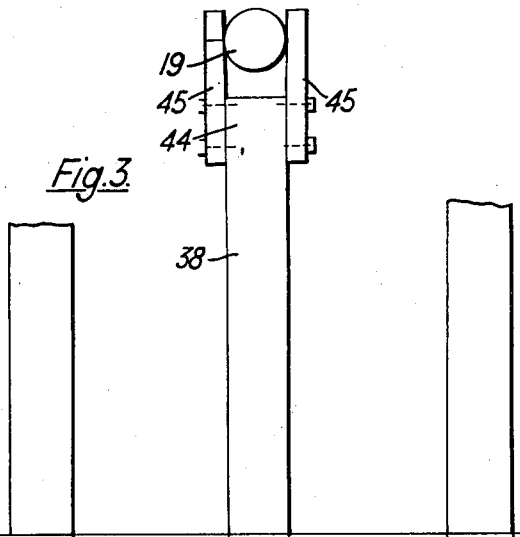
Fig. 3.
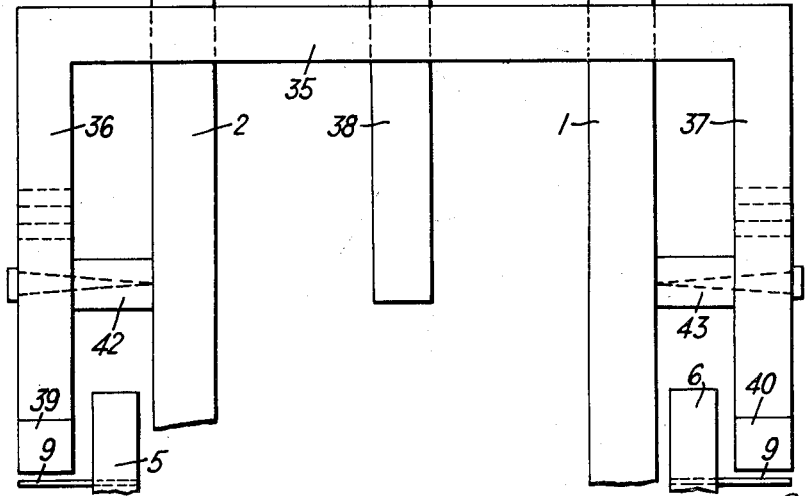
Fig. 4.
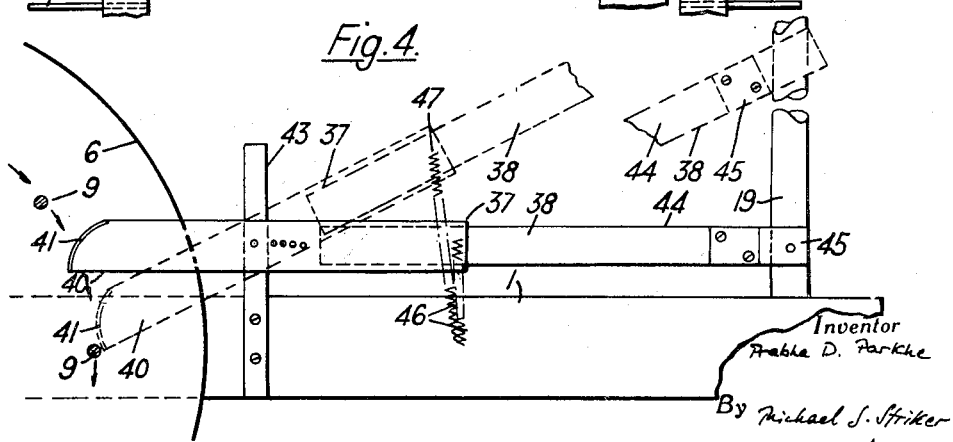

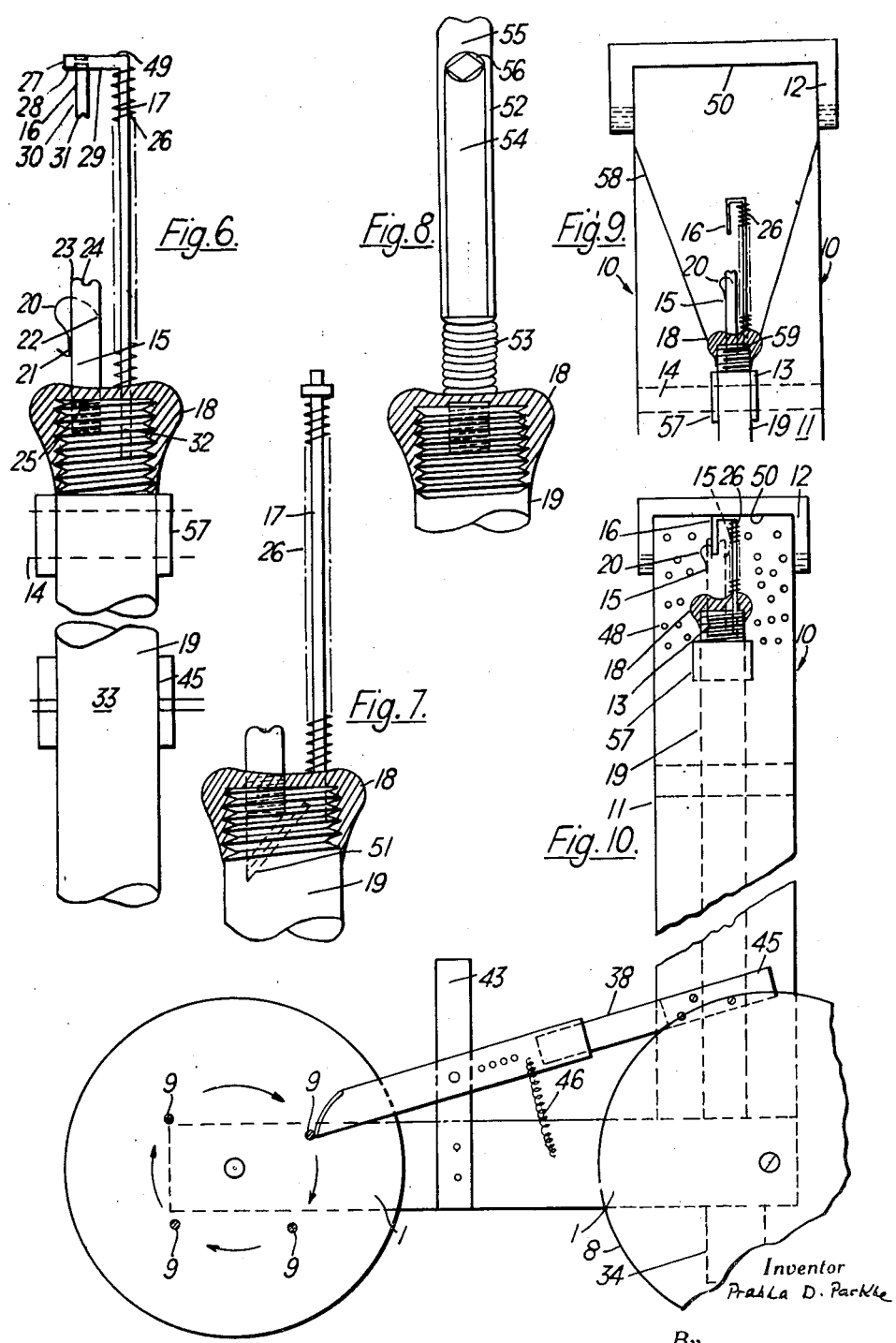

United States Patent Office 3,136,275
Patented June 9, 1964

3,136,275
SEED DRILLING MACHINES
Prabha D. Parkhe, 24/3-E. 3, Gandhipuram 1,
Rajahmundry, Andhra Pradesh, India
Filed Mar. 22, 1962, Ser. No. 181,716
4 Claims. (Cl. 111—34)

The present invention relates to agricultural machines. More particularly the invention relates to a seed drilling machine for sowing seed or distributing fertilizer in regularly spaced rows.

To get the best yield from the land, seed should be sown or fertilizer should be distributed uniformly and evenly. For the purpose of brevity, seed sowing or fertilizer distribution will hereinafter be referred to as "seed sowing."

The usual known methods of sowing seed, such as, by broadcasting, dibbling or ploughing it in the land have the drawback that they fail to satisfy one or the other of the above mentioned desiderata.

This invention has, for its main objects, a seed drilling machine capable of being driven by animals or power, which is simple in construction, easy to operate and which while being in motion automatically picks up one seed at a time and automatically releases the said seed on the furrows or channels on the soil and thus uniformly sow seeds.

With these objects in view, this invention consists of a seed drilling machine which is mounted on wheels capable of being driven by animals or power and which has, in combination, a framework on which is supported a hopper in which may be stored seeds to be sown in furrows; and means whereby the said seeds may be automatically conveyed one by one into the said furrows, characterized in that the said means consists of a seed selecting tube attached to a seed delivery tube, the said seed selecting tube being adapted to be moved up and down within the said seed hopper and adapted also to select a single seed when it is in the "down" position, the said seed selecting tube co-acting with a seed pushing mechanism which is adapted to push down the said seed into the said seed delivery tube when the seed selecting tube is in the "up" position.

In one embodiment of the invention, the said seed selecting tube is moved up and down automatically through a rocking device which is connected to the seed delivery tube and which is adapted to be rocked automatically by the rotation of the wheels of the said machine.

In another embodiment, the said rocking device consists of an E-shaped member the shorter middle arm of which is extended backward and connected to the seed delivery tube and its two outer longer arms are positioned so as to be temporarily pushed down by the lugs or the like projections provided at spaced distances apart on the outer periphery of the rear wheels of the machine.

A feature of my invention is that the said seed selecting tube is fitted with a spring band the lower end of which is fixed on the exterior of the said tube while its upper end passes through a slot provided near the mouth of the said tube and moves transversely with an upward incline towards the wall opposite to the said slot, and the said upper end of the spring band terminates at the inner surface of the said wall of the seed selecting tube.

Another feature of my invention is that the seed pushing mechanism rests on a helical spring supported at the top end of the seed delivery tube and consists of a rod and a bent arm with the free end of the said bent arm remaining directly above the mouth of the seed selecting tube and adapted to move downward so as to push the selected seed down into the seed delivery tube as soon as the seed selecting tube is in its "up" position.

Further, the top of the seed delivery tube is provided with a cap having two holes on its crown and wherein the seed selecting tube is fixed centrally on the crown of the said cap with its lower end protruding through one of the said two holes of the cap into the seed delivery tube.

One end forming the lower end of the rod of the pushing mechanism is slidably held over the other hole of the crown of the cap with the helical spring wound around the body of the said rod thereby keeping the said pushing mechanism upward when in the normal position.

The present invention includes the provision whereby when the said pushing mechanism is in the "down" position, the rod of the said pushing mechanism slides into the seed delivery tube through the hole of the cap on which the said rod is held.

The present invention also includes the provision whereby the said rocking device is spring actuated so as to accelerate its movement to the normal position after it has been disturbed from the said normal position as a result of being hit by the lugs provided on the periphery of the wheels.

The above and other features of the present invention will now be described in detail in connection with certain preferred embodiments thereof, given by way of example only and illustrated in the accompanying drawings, wherein:

FIG. 1 is a top plan view of the seed drilling machine of the present invention;

FIG. 2 is its side elevation partly in section, when in the normal position;

FIG. 8 is a plan of the rocker arm showing its position on the frame of the seed drilling machine;

FIG. 4 shows a side view of the rocker arm while it is in action;

FIG. 5 is an enlarged view of the seed picking tube, the pushing rod with its bracket and the cap which is fitted on the top end of the seed delivery tube;

FIG. 6 is a reduced view of what is shown in FIG. 5 but with a complete view of the seed delivery tube;

FIG. 7 is a modification of the arrangement illustrated in FIG. 5;

FIG. 8 is a further modification of what is illustrated in FIG. 7;

FIG. 9 is a modified construction of the seed hopper;

FIG. 10 illustrates the side elevation of the seed drilling machine similar to that shown in FIG. 2 but when it is not in normal position; and FIG. 11 is a top view of the seed selecting tube 15.

Now, referring to the drawings, the seed drilling machine according to this invention consists mainly of the following five parts, namely, (i) the chassis; (ii) the mechanism for picking a seed; (iii) the mechanism for delivering a seed; (iv) a rocking device; and (v) the seed or fertilizer box.

The framework of the chassis is roughly rectangular in shape as illustrated in FIG. 1. The framework has two longitudinal sides 1 and 2 parallel to each other and two shorter sides 3 and 4 also parallel to each other but at right angles to the sides 1 and 2.

The framework is mounted on four wheels—two front wheels 7 and 8 and two rear wheels 5 and 6 respectively.

On the outer surface near the outer edge of the rear wheels 5 and 6, a number of lugs or like projections 9, 9, are provided and the said lugs are in spaced relation with one another.

On the front side of the seed drilling machine is provided a seed or fertilizer hopper 10 which rests on two planks or like supports 11, 11 (only one of the planks 11 is visible in the drawings, as in FIGS. 2 and 10) fitted to the sides 1, 2 and 4 of the framework. The top of the seed hopper 10 is covered by a flat lid 12 which is fixed thereon. The seed hopper 10 is thus a boxlike structure in which seeds for sowing or fertilizers for distribution are stored. Further, the said hopper 10 is provided with a central hole 13 at its bottom 14.

Now, the seed selecting and the seed delivery means mainly consists of: (i) a seed selecting tube 15; (ii) a seed pushing mechanism consisting of a rod 17; (iii) a bent arm 16 of the pushing rod 17; (iv) a cap 18 and (v) a seed delivery tube 19.

The seed selecting tube 15 is a small tube made of rigid material and is fitted centrally on one of the two holes (not shown) on the cap 18 which is fixed on the top end of the seed delivery tube 19. A spring band 20, the lower end 21 of which is fixed on the exterior of the seed selecting tube 15 and its upper end 22 which passes through a slot (not shown) provided near the mouth of the said tube, moves transversely downwards inside the said tube 15 with a downward incline towards the wall opposite to the said slot, and the free end of the said upper end touches the inner surface on the side (opposite to the said slot) where it terminates. The purpose of this spring band 20 is to hold the seed in the seed selecting tube 15 before being released. The upper end 23 (see FIG. 5) of the seed selecting tube 15 is made slightly slanting and converging inside and thus two depressions 24, 24 (only one such depression is seen in the drawing) are formed on the edges of the upper end 23 of the said tube 15. These depressions serve easily the purpose of selecting one or more seeds at a time while other seeds will fall down in the seed hopper 10 when once a seed or seeds are already selected due to the position of the spring 20 near the upper end 23 of the tube 15 which enables one or more seeds to be supported by the spring in the tube. The lower end 25 (see FIG. 5) of the seed selecting tube 15 when fitted on the cap 18 protrudes through the central hole of the said cap into the seed delivery tube 19 at the upper end.

The rod 17 of the pushing mechanism is a square or angular rod and is slidably held over the other slot (not shown) of the cap 18 by a helical spring 26 which is wound around the body of the rod 17. The said spring 26 holds the said rod in a vertical upward position on account of the tension of the said spring, when in the normal position (see particularly FIGS. 2 and 5).

The free end 27 forming the upper end of the rod 17 is bent at right-angles to the body of the said rod 17 so as to form a bent arm 16 of the said pushing mechanism.

Now, the bent arm 16 has its one end 28 fixed to the inner surface 29 (see FIG. 5) of the free end 27 of the rod 17, so that the said bent arm 16 is vertically fixed and its lower free end 30 faces down and points towards the open end 23 of the seed picking tube 15 situated at a lower level. The said free end 30 of the bent arm 16 is made slightly slanting and has a small depression 31, so that the said end 31 gets a firm grip over the seed when the said bent arm slides inside the seed selecting tube 15.

It may be noted that both the selecting tube 15 and the bent arm 16 of the seed pushing mechanism are detachably fixed so that such tubes and bent arms of various other dimension may be fixed to suit various shape and size of the seeds for sowing purpose.

When the rod 17 of the pushing mechanism slides down, its lower end 32 (see FIGS. 5, 6 and 10) moves vertically downwards through the second slot (not shown) on the cap 18 into the seed delivery tube 19.

The seed delivery tube 19 is a long hollow cylindrical tube except for its upper end on which the cap 18 is fitted with the seed selecting tube 15 and the rod 17 of the seed pushing mechanism with the bent arm 16 mounted on the said cap 18. The lower end 33 is either of the same dimension as the rest of the part of the said tube 19 as in FIG. 6 or may end in a larger tube 34 as illustrated in FIGS. 2 and 10, and terminate just above the furrows of the soil.

For enabling the seed delivery tube 19 to move up and down, a rocking device consisting of a rocker arm 35 is provided for that purpose. As shown in FIG. 3, the rocker arm 35 is E-shaped having two extended arms 36 and 37 and a middle arm 38. The rocker arm 35 horizontally remains over near the middle of the framework of the seed drilling machine with its two extended arms 36 and 37 extending out of the longitudinal sides 2 and 1 of the framework in such a way that some outer end portions of the rear wheels 5, 6 remain within the free ends 39 and 40 and the two longitudinal sides 2 and 1 as illustrated in FIG. 3.

The free ends 39 and 40 of the two extended arms 36 and 37 have smoothly curved ends 41, 41 (only one such curved end is shown in the drawings, see for example, FIG. 4).

Two poles 42, 43 which are wider in thickness than the thickness of the rear wheels 5 and 6, are vertically fitted on outer surface of the longitudinal sides 2 and 1 of the frame work as illustrated in FIGS. 3 and 4. The two extended arms 37 and 36 are pivotally mounted on the said poles 43 and 42 in such a way that the curved ends 41, 41 of the free ends 39 and 40 of the said extended arms 37 and 36 are in alignment with the number of studs or like projections 9, 9 of the rear wheels 5 and 6 and in that rocker arm 35 remains parallel to and above the framework of the seed drilling machine.

Further, a spring 46 one end of which is fixed to the side of the end 47 opposite to the curved smooth end 40 and the other end of the said spring which is fixed to the outer surface of one of the longitudinal sides 1, pulls down the rocker arm 35 to its normal position, as illustrated in FIG. 4, the moment one of the studs or projections 9 slides out and cuts off its connection with the curved smooth end 40 of the extended arm 37. That is, in its normal position, the spring 46 due to its downward tension pulls down the end 47 of the extended arm 37 so that the rocker arm 35 is held horizontally at a slightly higher level above the framework. The purpose of this spring 46 is, therefore, to accelerate the movement of the rocking device to its normal position after it has been disturbed as a result of being hit by the lugs 9, 9 provided on the periphery of the wheels 5 and 6.

The middle short arm 38 of the rocker arm 35 extends backwards in the opposite direction (that is, towards the rear of the seed drilling machine) and its rear end 44 is connected to the outer surface of lower portion of the seed delivery tube 19 by means of a clamp 45.

A bushing 57 or the like may be provided on the central bottom hole 13 of the seed hopper 10 for the steady and straight movements of the said delivery tube 19.

Now, the following is the manner in which the seed drilling machine according to my invention operates:

Seeds 48 (as illustrated in FIGS. 2 and 10) are poured into the seed hopper 10. As soon as this is done the seed hopper is filled with seeds 48 and one of the seeds (not shown) falls by itself on the upper end 23 of the seed selecting tube 22 and is held inside the said tube 22 by the tiny spring band 20 the diagonally formed end 22 of which prevents the said seed from dropping out through the said tube. The depressions 24 on the upper end 23 of the seed selecting tube prevent any other seed from getting inside the selecting tube 22 and at the same time also prevents the only seed already inside the said tube from slipping out from the upper end 23 of the tube 22 due to possible jerks that might occur while the machine is in motion.

When the machine is in motion, the lugs or like projections 9, 9 start moving with the rear wheels 5 and 6 until the said lugs 9 come in contact with the smooth curved ends 40, 40 as shown in FIG. 4. Thereafter, due to the motion of the machine which may be animal or power driven, the lugs 9 slide along the edges of the ends 40 and while doing so pushes down the said ends 40 whereby the other ends 47, 47 of the two extended arms 36 and 37 move upwards. As soon as this happens, the seed delivery tube 19 which is connected to the rocker arm 35 through its middle extended short arm 38, moves upwards so that its top end slides upwards through the opening 13 formed at the bottom 14 of the seed hopper 10. The upwards movement of the tube 19 causes the rod 17 of the seed pushing mechanism also to move upwards and while doing so the outer surface 49 of the end 27 of the said rod 17 hits and presses against the inner-surface 50 whereby the rod 17 is pushed down and its lower end 32 vertically moves into the upper side of the seed delivery tube 19 through the slot (not shown) of the cap 18. When this happens, the pushing bent arm 16 of the seed pushing mechanism also moves downwards and slides into the seed selecting tube 21 against the bias of spring 26 so that the end 22 of the spring band 20 which till now was holding the only seed (not marked) inside the seed selecting tube 15, yields and becomes temporarily flat (as illustrated in FIG. 10) and allows the said seed to drop below into the seed delivery tube 19 and finally drop on the furrows through the lower end 33 of the seed delivery tube 19. All this happens instantaneously and within that short time the lugs 9, 9 of the rear wheels come in contact with the ends 40, 40 of the extended arms of the rocker arm, the said lugs slide along the edges of the smooth curved ends 41, 41 and move away from the said ends 41, 41.

As soon as the lugs 9, 9 move away and cut off connection with the said ends 41, 41 the spring 46 pulls down the ends 47, 47 of the extended arms 37 and 36 to their original position. When this is done, the seed delivery tube 19 also slides down along with the rod 17 of the seed pushing mechanism. Immediately, the upper surface 49 of the end 27 of the said rod 17 becomes out of contact with the inner surface 50 of the seed hopper 10 and the helical spring 26 pushes up the rod 17 to its original normal position, so that the bent arm 16 of the pushing mechanism moves out upwards and is away from the seed selecting tube 15. By the time this happens, one of seeds (i.e. the next seed) automatically falls into the seed picking tube 15 and by that time the end 22 of the spring band 20 comes to its original shape and holds the next second seed securely inside the tube 15.

This process is thereafter repeated with the result that seeds of uniform size are continually picked up and released.

In FIGS. 7 to 9 are illustrated a few modified constructions in respect of certain parts of the invention.

In FIG. 7 is shown a modified construction of a seed picking device as distinct from that shown in FIG. 6. In FIG. 7, there is a flat disc 51 which is slanting and permanently fixed to the lower end of the rod 17. This disc serves as a flap and opens or closes when the rod 17 slides down or up. This construction altogether does away with the bent arm 16 of the pushing mechanism. This design is specially meant for fertilizer distribution and distributing more number of seeds.

In FIG. 8 is shown another modification of the seed selecting device. Here, the rod 17 is replaced by an outer tube 52 which is attached to a spring 53 and slides over inner tube 54. The seed rests in between the empty space 55 of the outer and inner tubes 52 and 54. The inner tube 54 here is the seed selecting tube and has got 4 converging elastic spring like flaps 56 on which the selected seed (not shown) rests. When outer tube 52 with the inner tube 54 moves upwards, its upper end presses against the inner surface 50 of the flat lid 12 of the seed hopper 10. The spring 53 pushes the inner tube 54 upwards inside the outer tube 52 until the free end of said inner tube contacts the inner surface 50 of the lid 12 and causes the seed on flaps 56 to be pressed by said inner surface against said flaps, so that due to the elasticity of the said flaps 56, the seed automatically slips into the tube 54; the said flaps opening under the pressure of the inner surface 50 to widen the passage for the seed. This device serves better for seeds of irregular shape and size.

In FIG. 9 is shown a modified arrangement of the seed hopper 10.

Apart from the seed hopper 10, a conical bag 58 is provided within the hopper 10. The lower end 59 of the conical bag 58 is tightly fixed to the cap 18 and forms integral part of it. Seeds are stored in the said bag 58. When the seed selecting mechanism moves up, naturally the conical bag 58 also moves up and after the usual seed selecting and its release are over due to the weight of the conical bag 58 as well as due to the gravity, the seed selecting mechanism automatically moves down without the need of the spring 46. By this modification, the need of the spring 46 is, thus, altogether discarded. The arrangement of FIG. 9 thus functions automatically without the spring 46 and the weight of the bag 58 causes the seed delivery tube 19 and its accessories to move to normal position by gravity force.

It is to be understood that the seed drilling machine illustrated in the drawings have been described merely by way of examples, and not by way of limitation, and that departures may be made therefrom to suit various conditions without departing from the spirit of the invention.

What I claim is:

1. A seeding arrangement comprising, in combination, a framework supported on wheels adapted to rotate on a supporting surface;
a seed hopper supported on said framework;
a seed delivery tube extending from said hopper for directing a seed from said hopper to said supporting surface;
a seed selecting tube mounted for up and down movement extending from said seed delivery tube into said hopper and having an open end in said hopper for positioning and supporting a seed from said hopper;
seed pushing means positioned in said hopper in operative proximity with said seed selecting tube for pushing a seed supported in said seed selecting tube into said seed delivery tube when said seed selecting tube is moved upward in said hopper, said seed pushing means comprising a rod slidably supported at one end on said seed delivery tube, means urging said rod in an upward direction, a bent arm affixed at one end to the other end of said rod and having a free end positioned above the open end of said seed selecting tube and adapted to extend into the said seed selecting tube to push said seed into said seed delivery tube when the said seed selecting tube is moved upward in said hopper;
control means coupled to said seed delivery tube and operated by said wheels for moving said seed selecting tube upward in accordance with the rotation of said wheels; and means for obstructing the upward movement of the rod of said seed pushing means to enable the free end of the bent arm of said rod to enter into the open end of said seed selecting tube to push said seed into said seed delivery tube.

2. A seeding arrangement comprising, in combination, a framework supported on wheels adapted to rotate on a supporting surface;
a seed hopper supported on said framework;
a seed delivery tube extending from said hopper for directing a seed from said hopper to said supporting surface;
a seed selecting tube mounted for up and down movement extending from said seed delivery tube into said hopper and having an open end in said hopper for positioning and supporting a seed from said hopper;
seed pushing means positioned in said hopper in operative proximity with said seed selecting tube for pushing a seed supported in said seed selecting tube into said seed delivery tube when said seed selecting tube is moved upward in said hopper, said seed pushing means comprising a rod slidably supported at one end for up and down movement on said seed delivery tube, spring means urging said rod in an upward direction, a bent arm affixed at one end to the other end of said rod and having a free end positioned above the open end of said seed selecting tube and adapted to extend into the said seed selecting tube to push said seed into said seed delivery tube when the said seed selecting tube is moved upward in said hopper;

control means coupled to said seed delivery tube and operated by said wheels for moving said seed selecting tube upward in accordance with the rotation of said wheels and means for obstructing the upward movement of the rod of said seed pushing means to enable the free end of the bent arm of said rod to enter into the open end of said seed selecting tube to push said seed into said seed delivery tube.

3. A seeding arrangement comprising, in combination, a framework supported on wheels adapted to rotate on a supporting surface;

a seed hopper supported on said framework;

a seed delivery tube extending from said hopper for directing a seed from said hopper to said supporting surface, said seed delivery tube having a cap on its end in said hopper, said cap having a pair of spaced holes formed therethrough;

a seed selecting tube mounted for up and down movement in one of the holes through the cap in said seed delivery tube, said seed selecting tube extending from said seed delivery tube into into said hopper and having an open end in said hopper for positioning and supporting a seed from said hopper;

seed pushing means positioned in said hopper in operative proximity with said seed selecting tube for pushing a seed supported in said seed selecting tube into said seed delivery tube when said seed selecting tube is moved upward in said hopper, said seed pushing means comprising a rod slidably mounted for up and down movement in the other of the holes through the cap on said seed delivery tube for passing a seed through said seed selecting tube when said seed selecting tube is moved upward in said hopper and spring means urging said rod in an upward direction;

control means coupled to said seed delivery tube and operated by said wheels for moving said seed selecting tube upward in accordance with the rotation of said wheels; and means for obstructing the upward movement of the rod of said seed pushing means to enable said rod to pass a seed through said seed selecting tube.

4. A seeding arrangement comprising, in combination, a framework supported on wheels adapted to rotate on a supporting surface;

a seed hopper supported on said framework;

a seed delivery tube extending from said hopper for directing a seed from said hopper to said supporting surface;

a seed selecting tube mounted for up and down movement extending from said seed delivery tube into said hopper and having a lower open end in said seed delivery tube and an upper open end in said hopper for positioning and supporting a seed from said hopper;

seed pushing means positioned in said hopper in operative proximity with said seed selecting tube for pushing a seed supported in said seed selecting tube into said seed delivery tube when said seed selecting tube is moved upward in said hopper, said seed pushing means comprising a rod slidably supported at one end on said seed delivery tube, means for urging said rod in a determined direction and a disc affixed to said rod in said seed delivery tube and adapted to cover the lower open end of said seed selecting tube in a determined position of said rod and to uncover the lower open end of said seed selecting tube in another determined position of said rod to pass a seed through said seed selecting tube;

control means coupled to said seed delivery tube and operated by said wheels for selectively moving the rod of said seed pushing means relative to said seed selecting tube to cover and uncover the lower open end of said seed selecting tube in accordance with the rotation of said wheels.

References Cited in the file of this patent
UNITED STATES PATENTS

| | | |
|---|---|---|
| 1,229,396 | Andres | June 12, 1917 |
| 1,387,352 | Clark | Aug. 9, 1921 |
| 2,099,013 | Hoagen | Nov. 16, 1937 |
| 2,415,577 | Bushue | Feb. 11, 1947 |
| 2,804,236 | Piazze | Aug. 27, 1957 |

FOREIGN PATENTS

| | | |
|---|---|---|
| 40,132 | Denmark | Apr. 29, 1929 |
| 491,925 | Italy | Mar. 13, 1954 |
| 74,759 | Netherlands | May 15, 1954 |